United States Patent [19]

Lang

[11] 3,909,406

[45] Sept. 30, 1975

[54] CLARIFYING AGENTS FOR WATER
[76] Inventor: John L. Lang, P.O. Box 1242, Midland, Mich. 48640
[22] Filed: Feb. 22, 1972
[21] Appl. No.: 228,336

Related U.S. Application Data
[63] Continuation-in-part of Ser. No. 144,416, May 17, 1971, abandoned.

[52] U.S. Cl. ................................................. 210/47
[51] Int. Cl.² ........................................... C02B 1/20
[58] Field of Search ................... 210/43, 47, 51–53, 210/42

[56] References Cited
UNITED STATES PATENTS

| | | | |
|---|---|---|---|
| 1,604,125 | 10/1926 | Kern | 210/47 |
| 1,872,262 | 8/1932 | Evans | 210/51 |
| 1,872,263 | 8/1932 | Evans | 210/53 X |
| 1,940,409 | 12/1933 | Fink | 210/47 |
| 2,310,009 | 2/1943 | Baker et al. | 210/51 |
| 2,416,007 | 2/1947 | Joachim | 210/53 X |
| 3,101,317 | 8/1963 | Starry | 210/52 |
| 3,285,849 | 11/1966 | Watanabe et al. | 210/52 |

FOREIGN PATENTS OR APPLICATIONS

| | | | |
|---|---|---|---|
| 227,429 | 1/1926 | United Kingdom | 210/52 |

Primary Examiner—Thomas G. Wyse

[57] ABSTRACT

The use of compounds of polyvalent cations with aluminate, borate, and aluminosilicate anions has been found to provide improved clarification methods for aqueous suspensions. The use of these materials is much more effective than that of the corresponding conventional mono-valent cation compounds. A particularly effective form of these clarifying agents results when preparation is carried out by high temperature methods, including the fusion of the reactants. Recycling of the used clarifying agents is possible using these materials, especially when the flocculated solids are incinerated during the ultimate disposal step.

1 Claim, No Drawings

CLARIFYING AGENTS FOR WATER

CROSS REFERENCES TO RELATED APPLICATIONS

This is a continuation-in-part of S.N. 144,416 filed May 17, 1971, entitled "Clarifying Agents for Water," abandoned.

BACKGROUND OF THE INVENTION

The problems involved in the purification of water, particularly that containing suspended solids, has been the subject of much investigation for an extended period. This is especially true in the cases of municipal water supply, sewage treatment, treatment of discharges from mineral dressing operations, food processing plants, breweries, and many other operations which are directed toward man's existence and endeavor. Many materials have been used to aid in the purification of water and wastes from such operations. Some of these are relatively old; the use of alum, ferric or ferrous salts alone or in conjunction with lime, sodium aluminate, soluble starches, water soluble natural, modified, and synthetic polymers, and the like are examples of such flocculating agents. Recently, much attention has been given to the use of natural gums and synthetic high molecular weight polyelectrolytes, as typified by poly(acrylic acid) and salts thereof, poly(vinylbenzene sulfonic acid) and salts thereof, poly(maleic acid) and salts thereof, the water dispersible reaction products of nucleophilic reagents with polymers containing vinyl benzylchloride and -bromide, poly(ethyleneimine), and many others. Relatively non-ionic polymers, as poly(acrylamide) have also found wide application for use in water clarification. Most of these materials must be used in certain pH ranges, and in proportion to the solids content of the waste, etc., the maintenance of which parometers may be difficult during continuous-basis operation.

SUMMARY OF THE INVENTION

The object of this invention is to provide a new water purification system.

Another object of this invention is to provide an inexpensive, easy method for removal of suspended solids from water, either by separation of clarified supernatant, or by providing a more easily filtrable mixture.

A further object of this invention is to provide a process which uses a new flocculating system which settles suspended solids from water at a rapid rate, and produces a satisfactorily clear supernatant portion which may be readily removed as purified water, thus greatly increasing the overall capacity of existing water purification installations.

Another object of this invention is to provide flocculating and settling agents which are physiologically inert, and non-contaminants in terms of the effects of them upon plants and animals.

Other objects will become apparent to those skilled in the art upon reading the specification and claims of this instrument.

In accordance with the invention, the water containing undesirable suspended solids is treated with an oxygen compound with aluminum, of oxygen with aluminum and silicon, of oxygen and boron and the like, which also contains a cation of at least one element selected from Groups II and VIII-Series 4 of the Periodic Table of Elements. These compounds are essentially those of polyvalent cations with anions such as aluminate, poly-aluminate, aluminosilicate, poly aluminosilicate, borate, poly borate, and the like.

Group II of the Periodic Table of Elements includes magnesium, calcium, strontium, barium, zinc, and cadmium. Group VIII-Series 4 includes iron, cobalt, and nickel.

The preferred embodiment of the invention comprises the use of finely ground fusion-formed compounds of calcium, magnesium, and barium with aluminate, aluminosilicate, poly aluminosilicate, and polyborate anions.

Many of these materials are prepared by calcining, i.e., heating at temperatures at which water and carbon dioxide are at least partly expelled, of such raw materials as limestones, dolostones, dolomites, argillaceous limestones, argillaceous dolostones, marls, clays, shales, metallurgical slags, and other materials containing silica, alumina, calcium, magnesium, barium, boron, iron, and chemically analogous elements.

An especially advantageous clarification agent of this type may be prepared by "clinkering," i.e., fusion reaction, of a mixture of limestone, clay and bauxite, so as to prepare a material containing 28% or more of calcium aluminate, followed by pulverization of the cooled clinker.

The use of these new clarifying agents is easily carried out, usually by simply mixing the untreated water with either the dry pulverized clarifying agent or a slurry thereof in water, allowing flocculation to take place in a quiescent or gently agitated settling zone, and the purified water removed by decantation, siphoning, pumping off, filtration or any of the known methods or combinations thereof.

An effective procedure involves the addition to the mixture of untreated water and clarifying agent of a ground mineral which has some ion-exchange capacity or characteristics.

Alternatively, the untreated water can be mixed with the clarifying agent in proper proportions, clarification allowed to take place, the supernatant clarified water removed, and the mixture of the thus-concentrated solid contaminant water, and clarifying agent recycled by mixing with another portion of untreated water. This procedure may be repeated several times; the number of cycles being dependent upon the degree of contamination of the untreated water and upon whether or not additional make-up increments of clarifying agent are added at each recycling stage. This recycle procedure produces extra volumes of clarified water, when using any of the separation procedures between cycles. Use of this procedure increases the solids content of the flocculated residue several fold, thus increasing the effective capacity of water treating plants when compared to conventional operation, also minimizing the volume of settled solids that must be dewatered, wet-incinerated, dried or transported for ultimate disposal. In the case of municipal waste treatment plants, this method of operation converts, for practical purposes, a secondary treatment plant into a tertiary stage treatment plant with little or no added capital costs, and also reduces the volume of sludge requiring de-watering, wet- or dry-incineration, or transportation for ultimate disposal.

Because of the inorganic nature of the material herein taught to be effective clarification agents, they can be recycled in another way; when incineration is used as the means for ultimate disposal, the ash therefrom contains the flocculating agent in rejuvenated or regenerated form. In some cases, the material is still in the form of particles sufficiently small as to be immediately re-useable at high levels of effectiveness; in other cases it may be fused into larger nodules which are nevertheless effective, but re-grinding restores the material to its original level of effectiveness when re-used.

The mixture of water and clarifying agent can be readily filtered, or can be de-watered by other methods in order to separate the clarified water from the residual solids. The settled solids may be wet-incinerated, dried, dry-incinerated, etc., used for land-fill, fertilizer, soil-builder, or otherwise used. They can be transported for ultimate disposal in a now-concentrated form, recycled in the same or other process, or otherwise discarded.

In the case of municipal waste water treatment, the settled solids and/or dewatered solids may be readily converted into an acceptable form of soil nutrient.

The materials herein elucidated as clarifying agents for water are biologically inocuous; they do not create ecological or toxicological problems in the water treated therewith. The chemical oxygen demand (C.O.D.) and biological oxygen demand (B.O.D.), and hence the total oxygen demand of these new flocculating agents are nil, of course, because they are already oxidized to an extent greater than that attainable at any temperature range in the liquidous state of water under reasonable pressures.

The following examples are given in order to merely illustrate the invention, and are not to be construed as limiting the invention in any way.

EXAMPLE I

Tricalcium aluminate was prepared by dissolving 18.12 g (0.02 mole) of ammonium alum in water and making the solution up to a total of 50.0 g, followed by reaction with an excess of ammonium hydroxide. The aluminum hydroxide so produced was filtered and washed until free of excess ammonium hydroxide, and then redispersed in water. To this dispersion was added 3.36 g (0.06 mole) of calcium oxide, and the mixture thoroughly mixed, dried on a hot plate until a paste of the finely divided solids resulted. This was placed in a platinum crucible and the physically bound water driven off by heating. An oxygen - acetylene torch was then used to heat and fuse the contents of the crucible at white heat, producing a homogenous light yellow glassy material. This was removed from the crucible, crushed into fine particles, and stored in a stoppered bottle. This product is that referred to as "tricalcium aluminate, (fused)" in the Examples.

In similar reactions at white heat, dicalcium silicate was formed by fusion together of 3.1 parts of silica sand with 4.4 parts of calcium oxide; tricalcium silicate by fusion together of 4.96 parts of calcium oxide with 2.8 parts of silica sand, zinc aluminate by fusion of the analogous zinc product as above for preparation of tricalcium aluminate, and magnesium aluminate by the same method, following coprecipitation of 1.4 parts sodium aluminate with 2.3 parts of hydrated magnesium sulfate from aqueous solution.

EXAMPLE II

To 50 milliliters of a typical activated sludge obtained from the secondary stage of a municipal waste treatment plant was added 0.14 g of powdered tricalcium aluminate (fused). The solids in the activated sludge flocculated. In similar tests, dicalcium aluminate, zinc aluminate, magnesium aluminate, sodium ferrite, calcium ferrite, and dicalcium silicate were used to treat activated sludge.

EXAMPLE III

A series of experiments were carried out using some of the flocculating agents herein concerned, as tricalcium aluminate, and a powdered cement containing 40% calcium aluminante, in comparison with known flocculating agents, viz.: alum, ferric chloride, ferric chloride plus lime, sodium aluminate and ferric chloride - sodium hydroxide, as settling agents for the solids in activated sludge as above described in Example II. One hundred milliliters of the treated sludge containing these agents was allowed to settle for 10 minutes (600 seconds) and the volume of clear supernatant recoverable water observed and recorded. The results are given in Table 1.

TABLE 1

| FLOCCULANT | AMOUNT g/100 ml | CLARIFIED VOLUME ml at 600 sec. |
| --- | --- | --- |
| Tricalcium Aluminate (fused) | 0.5 | 19. |
| "40% Tricalcium Aluminate Cement" "HTCAC" | 0.2 | 25. |
| Alum | 0.5 | 1. |
| Ferric Chloride | 0.1 | 1. |
| Ferric Chloride + Lime | 0.2 | 3. |
| Ferric Chloride + NaOH, to pH 8 | 0.54 | 0. |
| Sodium Aluminate | 0.52 | 0. |

In a similar test, tri-calcium aluminate (fused), tricalcium aluminate (as prepared), "40% tri-calcium aluminate cement," prepared from ca. 40% tri-calcium aluminate, ca. 50% tri-calcium silicate, and ca. 10% tricalcium silicate fused together, cooled, and pulverized (HTCAC), and calcium borate, the new flocculants concerned herein, were compared with the known, conventional flocculant Alum when used to clarify an activated sludge such as described in Example II. The results are given in Table 2.

TABLE 2

| CLARIFYING AGENT | AMOUNT g/100 ml | CLARIFIED VOLUME ml at 600 sec. |
| --- | --- | --- |
| Tricalcium Aluminate (fused) | 0.5 | 17. |
| Tricalcium Aluminate (as prepared) | 0.5 | 12. |
| Calcium Borate | 0.5 | 9. |
| "40% Tricalcium Aluminate Cement" ("HTCAC") | 0.5 | 6 |
| Portland Cement | 0.5 | 3. |
| Alum | 0.5 | 1. |
| Blank | — | 1. |

EXAMPLE IV

A comparison was made of filtration rates of untreated activated sludge as described in Example II with the rate obtained when it was treated with a typical clarifying agent of the invention and when treated with the conventional inorganic flocculating agents. The data are given in Table 3.

TABLE 3

| FLOCCULANT | AMOUNT g/100 ml | FILTRATION RATE (% of volume total/sec) × 100 |
|---|---|---|
| Tricalcium Aluminate | 0.273 | 30.1 |
| Alum | 0.5 | 21.7 |
| Ferric Chloride + Lime | 0.2 | 16.8 |
| Sodium Aluminate | 0.52 | 3.96 |
| BLANK | 13 | 6.88 |

Additional work was done comparing the filtration volume at 400 seconds in percent of original volume of sludge. The tricalcium aluminate clarifying agent of this invention was compared with conventional inorganic flocculating agents of commerce. These data were obtained by methods given in the description of Example IV. The results are tabulated in Table 4.

TABLE 4

| FLOCCULANT | AMOUNT g/100 ml | % VOLUME FILTERED at 400 seconds |
|---|---|---|
| Tricalcium Aluminate | 0.273 | 86. |
| Alum | 0.5 | 86. |
| Ferric Chloride + Lime | 0.5 | 83. |
| Ferric Chloride + NaOH to pH 8 | 0.54 | 38. |
| Sodium Aluminate | 0.2 | 37. |
| BLANK | — | 73. |

EXAMPLE V

A set of experiments was carried out in which a comparison was made to show the effect of the valence of the positive ion of the inorganic clarifying agent upon the clear volume obtained ten minutes after treatment of activated sludge with aluminates and ferrites of mono- and di-valent ions. This shows the marked superiority of the poly-valent ion compounds of this invention over the mono-valent ion compounds of the conventional flocculating agents. These data are given in Table 5.

TABLE 5

| FLOCCULANT | AMOUNT g/100 ml | VALENCE OF + ION | CLARIFIED VOLUME ml at 600 seconds |
|---|---|---|---|
| BLANK | — | — | 1. |
| Sodium Aluminate | 0.5 | 1 | 1. |
| Tricalcium Aluminate | 0.5 | 2 | 17. |
| Sodium Ferrite | 0.54 | 1 | 0. |
| Calcium Ferrite | 0.5 | 2 | 2. |
| Ferrous Aluminate | 0.5 | 2 | 2. |
| Ferric Aluminate | 0.5 | 3 | 4. |

EXAMPLE VI

In an experiment in which a comparison was made of the efficacy of "fused-" with "unfused-" clarifying agents of the invention, an activated sludge similar to that described in Example II was treated with both types of material. The data obtained are given in Table 6.

TABLE 6

| FLOCCULANT | TREATMENT | AMOUNT g/100 ml | CLARIFIED VOLUME ml at 600 seconds |
|---|---|---|---|
| BLANK | — | — | 1. |
| Tri-calcium Aluminate | Unfused | 0.5 | 12. |
| Tri-calcium Aluminate | Fused | 0.5 | 17. |
| "40% Tricalcium Aluminate Cement" "HTCAC" | Unfused | 0.34 | 4. |
| "40% Tricalcium Aluminate Cement" "HTCAC" | Fused | 0.34 | 6. |

EXAMPLE VII

A study similar to that described in Example VI was carried out in which several inorganic flocculants were compared. The data given in Table 7 again shows the efficiency of the polyvalent ion compounds of the invention are characteristic of this group of elements.

TABLE 7

| FLOCCULANT | AMOUNT g/100 ml | CLARIFIED VOLUME ml at 600 seconds |
|---|---|---|
| BLANK | — | 1. |
| Magnesium Aluminate | 0.5 | 9. |
| Zinc Aluminate | 0.5 | 8. |
| MIXTURE "Synthetic" Calcium Aluminosilicate (Calcium silicate-Calcium Aluminate) | 0.5 | 12. |
| Portland Cement | 0.5 | 5. |

EXAMPLE VIII

A series of experiments were carried out in which the addition of a fine clay was added to the mixture of the clarifying agents of the invention and the activated sludge described in Example II. The data show the efficacy of this refinement, and are tabulated in Table 8.

TABLE 8

| FLOCCULANT | AMOUNT g/100 ml | ADDITIVE | AMOUNT g/test | CLEAR VOLUME ml at 600 sec. |
|---|---|---|---|---|
| BLANK | — | — | — | 1. |
| Tricalcium Aluminate | 0.5 | — | — | 4. |
| do. | 0.5 | Clay | 0.5 | 31. |
| Calcium Aluminosilicate | 0.5 | — | — | 12. |
| do. | 0.5 | Clay | 0.1 | 40. |
| do. | 0.5 | Volcanic Ash | 0.1 | 59. |

TABLE 8 — Continued

| FLOCCULANT | AMOUNT g/100 ml | ADDITIVE | AMOUNT g/test | CLEAR VOLUME ml at 600 sec. |
|---|---|---|---|---|
| "40% Tri-calcium Aluminate Cement" "HTCAC" | 0.5 | Clay | 0.1 | 27. |
| Alum | 0.5 | — | — | 1. |
| Ferric Chloride + Lime | 0.2 + 0.05 | — | — | 3. |
| Clay | 0.5 | — | — | 0. |
| Volcanic Ash | 0.5 | — | — | 0. |

EXAMPLE IX

A set of experiments was carried out using the inorganic flocculants of the invention to treat tannery waste and to treat brewery wastes. To 100 milliliter portions of each waste were added 0.1 g of tricalcium aluminate. Flocculation of material in the wastes took place in the case of both types of waste, the tannery waste and the brewery waste. Upon filtration of the flocculated mixtures, essentially uncolored filtrate was obtained in both cases.

EXAMPLE X

A comparison was made of the clear supernatant volume produced by the flocculants taught as part of this invention and the volumes produced by using conventional inorganic flocculants. The various materials were mixed with the activated sludge described in Example II, and allowed to stand for 10 minutes. The volumes of clear supernatant were recorded and are givven in Table 9. This experiment shows that these new flocculants are superior to the conventional types in respect to the ability to clear water of sludge solids without filtering.

TABLE 9

| FLOCCULANT | AMOUNT g/100 ml | CLARIFIED VOLUME ml at 600 sec. |
|---|---|---|
| BLANK | — | 1. |
| Sodium Aluminate (1) | 0.5 | 1. |
| Ferric Chloride + Lime (1) | 0.2 | 3. |
| Portland Cement | 1.0 | 6. |
| Tricalcium Aluminate | 0.5 | 12. |

(1) Conventional flocculants

I claim:

1. The process for purification of water which comprises the mixing of impure water with a water-hydratable material consisting essentially of an alumino-silicate of an element selected from the group consisting of magnesium, calcium, strontium, zinc, cadmium, iron, manganese, and copper, prepared by fusion of raw materials containing them optionally with density-regulating minerals having at least some ion-exchange characteristics.

* * * * *